United States Patent
Liu et al.

(10) Patent No.: US 9,516,681 B2
(45) Date of Patent: Dec. 6, 2016

(54) METHOD, DEVICE AND SYSTEM FOR ACCESSING CORE NETWORK BY MEANS OF NON-3GPP ACCESS

(71) Applicant: ZTE CORPORATION, Shenzhen, Guangdong (CN)

(72) Inventors: Guoyan Liu, Shenzhen (CN); Chunhui Zhu, Shenzhen (CN); Shuang Liang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 69 days.

(21) Appl. No.: 14/371,159

(22) PCT Filed: Dec. 21, 2012

(86) PCT No.: PCT/CN2012/087205
§ 371 (c)(1),
(2) Date: Jul. 8, 2014

(87) PCT Pub. No.: WO2013/104247
PCT Pub. Date: Jul. 18, 2013

(65) Prior Publication Data
US 2014/0355541 A1 Dec. 4, 2014

(30) Foreign Application Priority Data

Jan. 9, 2012 (CN) .......................... 2012 1 0004672

(51) Int. Cl.
*H04W 48/02* (2009.01)
*H04W 76/02* (2009.01)
(Continued)

(52) U.S. Cl.
CPC .............. *H04W 76/02* (2013.01); *H04W 8/24* (2013.01); *H04W 12/00* (2013.01); *H04W 76/022* (2013.01); *H04W 48/17* (2013.01)

(58) Field of Classification Search
CPC ...... H04W 12/00; H04W 48/17; H04W 76/02; H04W 76/022; H04W 8/24; H04W 36/12
(Continued)

(56) References Cited

U.S. PATENT DOCUMENTS 8,594,067 B2 * 11/2013 Zhou ..................... H04W 60/00
370/338
8,767,571 B2 * 7/2014 Faurie .................... H04W 8/24
370/252
(Continued)

FOREIGN PATENT DOCUMENTS

CN 101374334 A 2/2009
CN 101472263 A 7/2009
(Continued)

OTHER PUBLICATIONS

Supplementary European Search Report in European application No. 12865052.0, mailed on Sep. 18, 2015.
(Continued)

*Primary Examiner* — Mohamed Kamara
(74) *Attorney, Agent, or Firm* — Oppedahl Patent Law Firm LLC

(57) ABSTRACT

A method, device and system for accessing a core network by means of non-3rd Generation Partnership Project (3GPP) access are disclosed, so as to acquire capability information of a User Equipment (UE) and/or capability information of a non-3GPP access system, and decide, according to the acquired capability information, whether the UE transfers information required for establishing an Evolved Packet Core (EPC) session. The disclosure can enhance the capability of the UE to support establishment of an extra Packet Data Network (PDN) connection and service continuity during switching between access systems. Meanwhile, the capability of a peer can be acquired through the UE and a
(Continued)

network, so that the network may support normal access by an existing UE and an enhanced UE simultaneously.

8 Claims, 11 Drawing Sheets

(51) Int. Cl.
*H04W 8/24* (2009.01)
*H04W 12/00* (2009.01)
*H04W 48/00* (2009.01)

(58) Field of Classification Search
USPC ............... 370/370, 252, 328, 338, 468, 401; 709/227–228
See application file for complete search history.

(56) References Cited

U.S. PATENT DOCUMENTS

| | | | |
|---|---|---|---|
| 2011/0131313 A1 | 6/2011 | Zhou | |
| 2012/0113968 A1 | 5/2012 | Zhou | |
| 2012/0246325 A1* | 9/2012 | Pancorbo Marcos | H04L 12/2602 709/227 |
| 2013/0121322 A1* | 5/2013 | Salkintzis | H04W 76/022 370/338 |

FOREIGN PATENT DOCUMENTS

| | | | |
|---|---|---|---|
| CN | 101631354 A | 1/2010 | |
| CN | 101931946 A | 12/2010 | |
| JP | EP2079261 A1 * | 7/2009 | ............ H04W 36/12 |

OTHER PUBLICATIONS

3GPP TS 33.402 v11.1.0, Sep. 2011; Please see attached Supplementary European Search Report.
3GPP TS 24.302 v1.0.0, Oct. 2008; Please see attached Supplementary European Search Report.
Draft new Recommendation Y.mobSec, "Mobility Security Framework in NGN", Jan. 2009; Please see attached Supplementary European Search Report.
3GPP TS 23.402 V11.1.0, 3rd Generation Partnership Project; Technical Specification Group Services and System Aspects; Architecture enhancements for non-3GPP accesses (Release 11), Dec. 2011, See International Search Report.
International Search Report in international application No. PCT/CN2012/087205, mailed on Mar. 21, 2013.
English Translation of the Written Opinion of the International Search Authority in international application No. PCT/CN2012/087205, mailed on Mar. 21, 2013.
AT&T, ZTE, NEC, Terminology Correction, mailed on Oct. 14, 2011.

* cited by examiner

METHOD, DEVICE AND SYSTEM FOR ACCESSING CORE NETWORK BY MEANS OF NON-3GPP ACCESS

TECHNICAL FIELD

The disclosure relates to the field of communications, and more particularly to a method, device and system for accessing a core network by means of non-3rd Generation Partnership Project (3GPP) access.

BACKGROUND

An Evolved Packet System (EPS) of 3GPP is composed of an Evolved Universal Terrestrial Radio Access Network (E-UTRAN), a Mobility Management Entity (MME), a Serving Gateway (S-GW), a Packet Data Network Gateway (P-GW) and a Home Subscriber Server (HSS).

An EPS supports intercommunication with a non-3GPP system (as shown in FIG. 1). The intercommunication between the EPS and the non-3GPP system is implemented through an S2a/b/c interface, and a P-GW serves as an anchor between a 3GPP system and the non-3GPP system. In an EPS system architecture diagram, access of a non-3GPP system is divided into non-trusted non-3GPP access and trusted non-3GPP access. The non-trusted non-3GPP access needs to be performed through connecting an Evolved Packet Data Gateway (ePDG) and a P-GW. An interface between the ePDG and the P-GW is an S2b interface. Trusted non-3GPP access needs to be performed through connecting an S2a interface and a P-GW. The S2a interface performs information interaction by means of a Proxy Mobile Internet Protocol (PMIP). In addition, an S2c interface provides user plane-related control and mobility support between a User Equipment (UE) and the P-GW. A mobility management protocol supported by the S2c interface is Mobile IPv6 Support for Dual Stack Hosts and Routers (DSMIPv6), which is applicable to non-trusted non-3GPP access and trusted non-3GPP access.

A Wireless Local Area Network (WLAN) may function as an Evolved Packet Core (EPC) of a non-3GPP system, and may support the above three interfaces including the S2a, S2b and S2c interfaces. At current, there are lots of studies about processes and policy routing of the S2b and S2c interfaces.

As such a method as using a WLAN as a trusted non-3GPP system to access an EPC is gradually accepted by operators, the problems of process refinement and policy routing of the S2a interface start to be studied. Firstly, methods for triggering establishment of an S2a session without enhancing functions of an existing UE have been studied. As shown in FIG. 2, after a UE completes a non-3GPP-specific process and an Extensible Authentication Protocol (EAP) authentication process, an L3 message is carried out between the UE and a network element of a Trusted Non-3GPP IP Access Network (TNAN). After receiving the L3 message, the TNAN initiates an S2a session establishment process to a P-GW of a mobile core network. Besides the L3 message, an L2 message may also function as a triggering mode, such as an EAP message. The above methods for triggering establishment of an S2a session have been discussed and substantially accepted.

Currently, a UE does not support transfer of information including an Access Point Name (APN) and a Packet Data Network (PDN) type. However, these information is key information required by a 3GPP EPC to establish an S2a session or to allocate an IP address to the UE. For example, if APN information cannot be acquired, an extra PDN connection cannot be established for the UE. If a PDN type cannot be acquired, a P-GW cannot sense an IP address type requested by the UE and can only allocate an IP address according to a subscribed IP address type of the UE, but such an allocation method easily causes waste of IP address resources. In addition, when 3GPP access is switched to non-3GPP access, a UE fails to transmit, to an EPC, information in which the IP address of the UE needs to be reserved, thus failing to ensure service continuity.

SUMMARY

In view of this, the disclosure provides a method, device and system for accessing a core network through non-3GPP, so as to acquire capability of a UE and decide whether to support establishment of an extra PDN connection and service continuity during switching between access systems.

To this end, a technical solution of the disclosure is implemented as follows.

A method for accessing a core network by means of non-3rd Generation Partnership Project (3GPP) access includes that:

a User Equipment (UE) sends capability information of the UE;

the UE receives a decision result indicating whether the UE is allowed to transfer information required for establishing an Evolved Packet Core (EPC) session; and the UE determines, according to the decision result, whether to transfer the information required for establishing the EPC session.

Wherein, the capability information of the UE may be carried in an Extensible Authentication Protocol (EAP) authentication message or a Dynamic Host Configuration Protocol (DHCP) message.

A method for accessing a core network through non-3GPP includes that:

capability information of a UE and/or capability or mode information of a non-3GPP access system is acquired; and it is decided, according to the acquired capability or mode information, whether the UE transfers information required for establishing an EPC session.

Wherein, acquiring the capability or mode information may be executed by the UE or the non-3GPP access system.

Wherein, when the decision is made by the non-3GPP access system, the non-3GPP access system may send, to the UE, a decision result indicating whether the UE is allowed to transfer the information required for establishing the EPC session.

Wherein, after the decision is made and it is determined to allow the UE to transfer the information required for establishing the EPC session, the method may further include that:

after the non-3GPP access system receives an Access Point Name (APN) requested by the UE, the non-3GPP access system transfers to an EPC the APN requested by the UE.

Wherein, information of the APN may be configured to implicitly represent capability of the UE.

Wherein, the capability information of the UE may be carried in an EAP authentication message or a DHCP message; and the information required for establishing the EPC session may be carried in the EAP authentication message or the DHCP message, Wherein, the capability information of the UE may be the APN requested by the UE or capability indication of the UE; and the information required for establishing the EPC session may be the requested APN.

Wherein, the capability information of the non-3GPP access system may be local capability indication of the non-3GPP access system.

Wherein, a communication entity making the decision may be the UE or the non-3GPP access system.

A system for accessing a core network by means of 3GPP access includes: a capability information acquisition unit and an enhanced information decision unit, wherein the capability information acquisition unit is configured to acquire capability information of a UE and/or capability or mode information of a non-3GPP access system; and the enhanced information decision unit is configured to decide, according to the capability or mode information acquired by the capability information acquisition unit, whether the UE transfers information required for establishing an EPC session.

Wherein, after the decision is made, the enhanced information decision unit may determine to allow the UE to transfer the information required for establishing the EPC session; and the enhanced information decision unit may be further configured to:

after receiving an APN requested by the UE, transfer to an EPC the APN requested by the UE.

Wherein, information of the APN may be configured to implicitly represent the capability of the UE.

Wherein, the capability information of the UE may be carried in an EAP authentication message or a DHCP message; and the information required for establishing the EPC session may be carried in an EAP authentication message or a DHCP message.

Wherein, the capability information of the UE may be the APN requested by the UE or capability indication of the UE; and the information required for establishing the EPC session may be the requested APN.

Wherein, the capability information acquisition unit may be arranged in the UE or the non-3GPP access system; and the enhanced information decision unit may be arranged in the UE or the non-3GPP access system.

A device for accessing a core network by means of 3GPP access is a UE, which is configured to, after sending capability information of the UE, receive a decision result indicating whether the UE is allowed to transfer information required for establishing an EPC session; and determine, according to the decision result, whether to transfer the information required for establishing the EPC session.

Wherein, the capability information of the UE may be carried in an EAP authentication message or the DHCP message.

The method, device and system of the disclosure can enhance the capability of the UE to support establishment of an extra PDN connection and service continuity during switching between access systems. Meanwhile, the capability of a peer can be acquired through the UE and a network, so that the network may support normal access by an existing UE and an enhanced UE simultaneously.

DETAILED DESCRIPTION

In a practical application, capability information of a UE and/or capability information of a non-3GPP access system may be acquired (directly or implicitly); and it is decided, according to the acquired capability information, whether the UE carries enhanced information required by an EPC, that is, it is decided whether the UE transfers information required for establishing an EPC session.

The non-3GPP access system may be a trusted non-3GPP access system, or may be also a non-trusted non-3GPP access system. Description is provided below by only taking a trusted non-3GPP access system as an example.

It should be noted that a communication entity making the decision may be a UE or a non-3GPP access system;

capability information carried by the UE may be an APN requested by the UE or capability indication of the UE;

information of the APN requested by the UE may represent capability of the UE implicitly.

capability information of the non-3GPP access system may be local capability indication of the non-3GPP access system;

enhanced information carried by the UE may be the requested APN; and if it is decided that the UE is allowed to carry the enhanced information, the non-3GPP access system will transfer to the EPC, after receiving the APN requested by the UE, the APN requested by the UE, for example, the non-3GPP access system transfers the APN requested by the UE to a P-GW.

If the decision is made by the non-3GPP access system, then the non-3GPP access system will send to the UE a decision result indicating whether the UE is allowed to carry the enhanced information;

the capability information of the UE may be carried through an EAP authentication message or a DHCP message; and the enhanced information of the UE may be carried through an EAP authentication message or a DHCP message.

The disclosure is elaborated below in combination with the accompanying drawings and embodiments.

Embodiment 1

Figure 1:
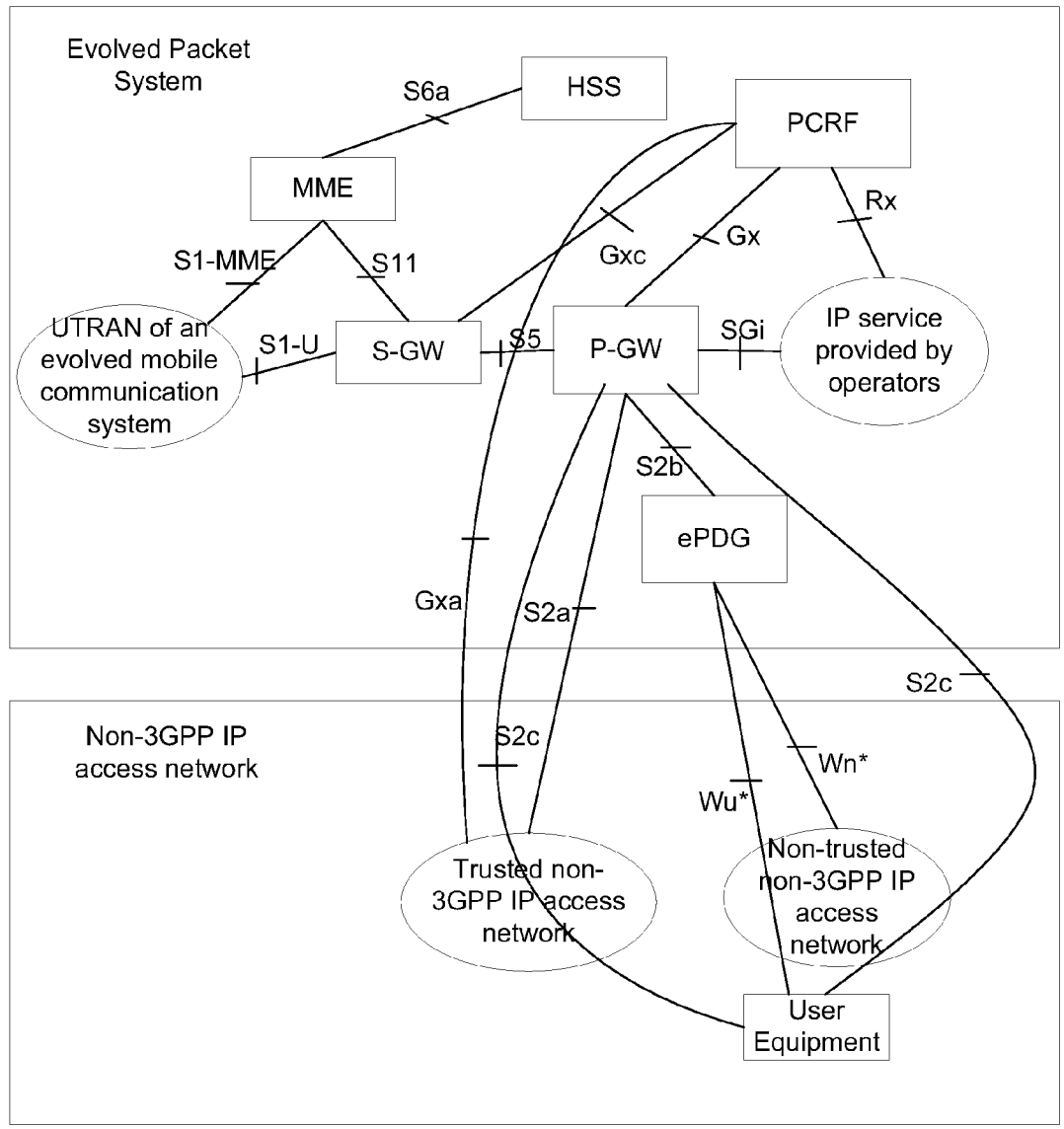
FIG. 1 is a network structure diagram illustrating intercommunication of a 3GPP network and a non-3GPP network in the prior art.
Figure 2:
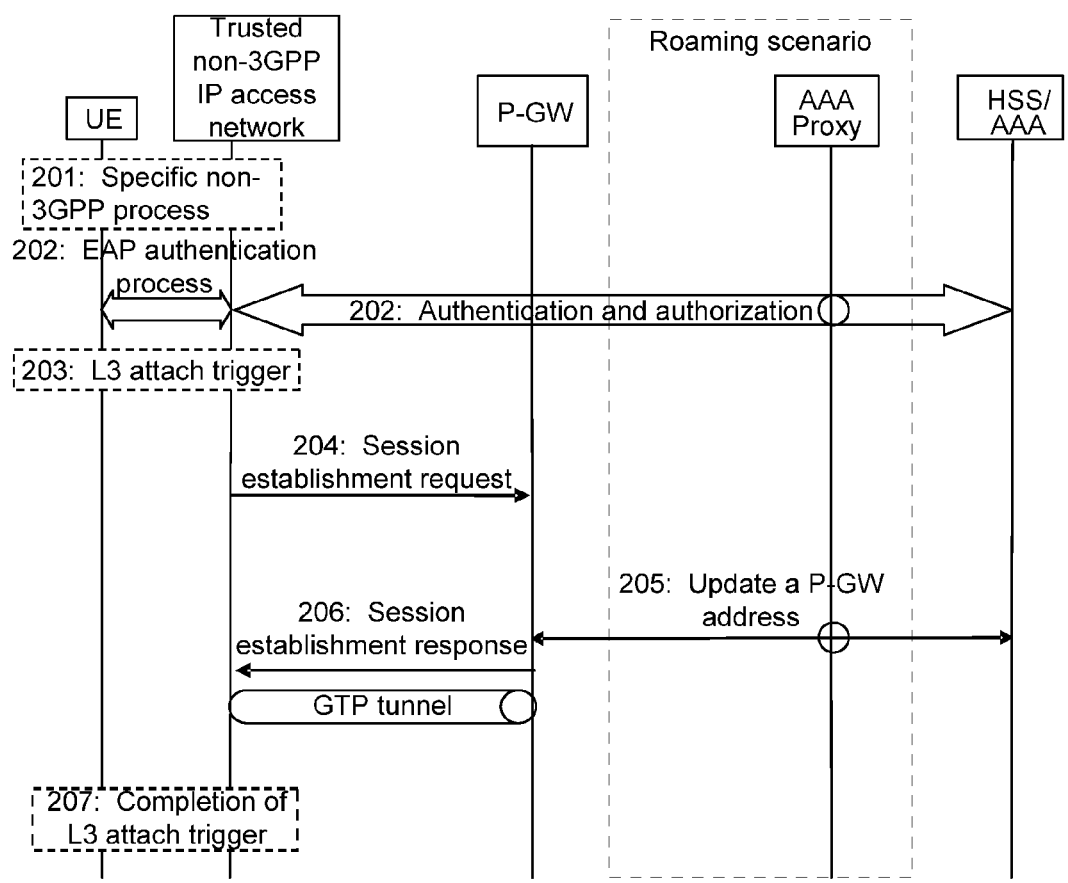
FIG. 2 is a flowchart illustrating accessing by a UE to an EPC through a trusted WLAN in the prior art.
Figure 3:
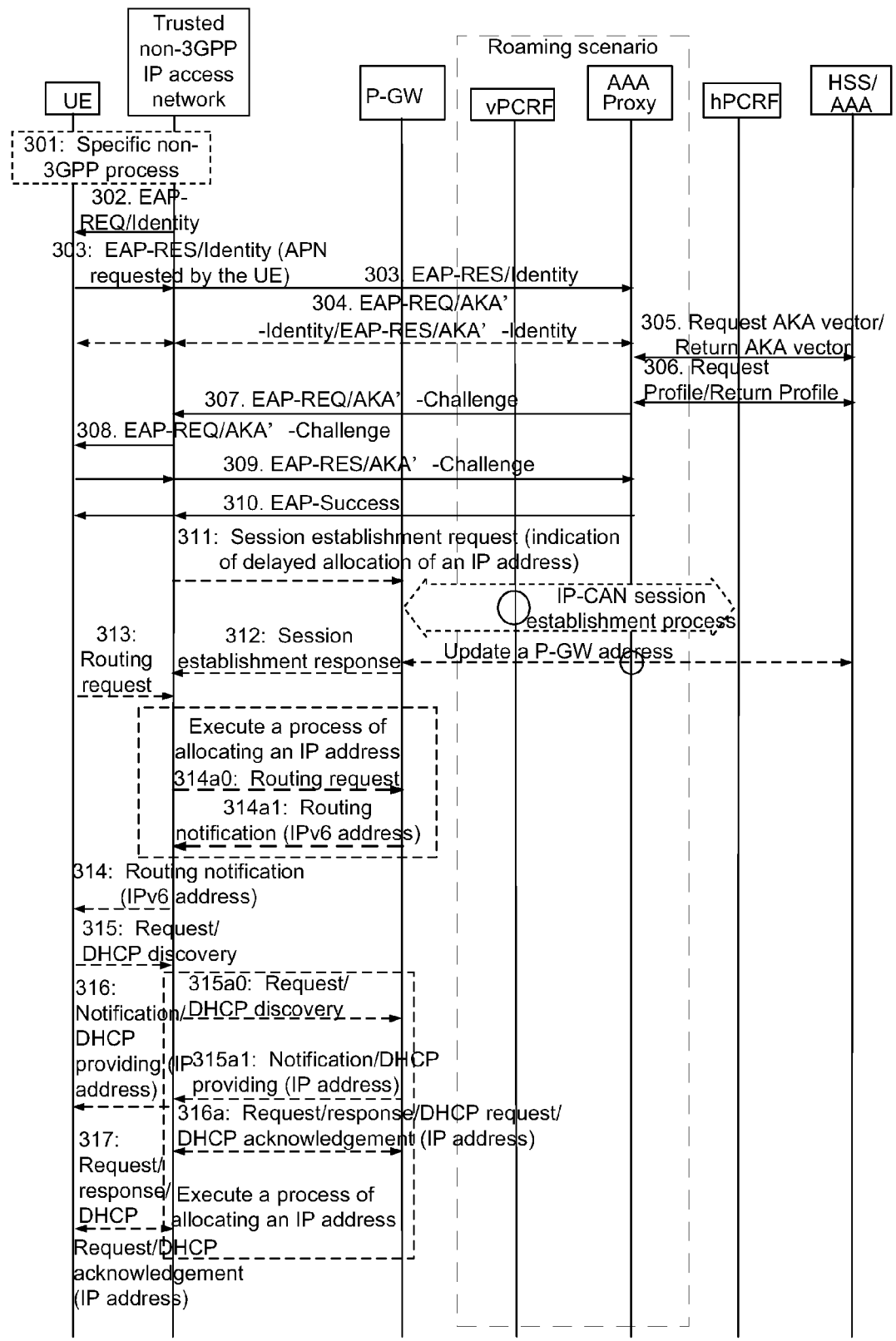
FIG. 3 is a flowchart of carrying an APN requested by a UE in an EAP authentication message by the UE in an embodiment of the disclosure.

In the present embodiment, when a UE accesses an EPC through trusted non-3GPP, an EAP authentication message supports to carry an APN requested by the UE to a TNAN, and the TNAN decides whether to support to carry the APN requested by the UE to the EPC. The EAP authentication message triggers the TNAN to establish a GTP/PMIP session to a P-GW, which may specifically refer to a flow as shown in FIG. 3. The flow includes the following steps:

Step 301: a UE and a network element of a TNAN execute a specific non-3GPP process, such as link establishment and access authentication.

Steps 302 to 310: the TNAN, as an EAP authenticator, will trigger an EAP authentication process to the UE, wherein the UE carries an APN requested by the UE in an EAP-RES/Identity message to the TNAN. In addition, the TNAN decides, according to the APN requested by the UE and a local policy, whether to allow the UE to carry the requested APN, which specifically includes that: if the TNAN supports the UE to carry the requested APN, then a subsequent process continue to be performed; or if the TNAN does not support the UE to carry the requested APN, a subsequent process is the same as a process in which a UE does not carry a requested APN in the prior art, and will not be repeated here.

Solutions for the UE to acquire an IP address specifically include several ways as follows:

Way 1: the EAP authentication message triggers the TNAN to establish a session through which an IP address is allocated to the UE.

Steps 311 to 312: after receiving an EAP-SUCCESS message, the TNAN ignores a received default EAP and will initiate a session establishment process to a P-GW; the TNAN carries the APN requested by the UE to the P-GW, and establishes an S2a session with the P-GW; the P-GW allocates an IP address for the UE and returns the IP address to the TNAN; and the TNAN stores the IP address locally, and the IP address may specifically include IPv4 and/or IPv6 addresses. The TNAN stores associations between UE Media Access Control (MAC) addresses and the IP addresses.

Steps 313 to 315: if the TNAN receives a routing request message, the TNAN finds, according to a UE's MAC address in the routing request message, an IP address corresponding to the UE's MAC address; and the TNAN sends a routing response message to the UE, wherein the routing response message carries the IPv6 addresses allocated by the P-GW to the UE.

Steps 316 to 317: if the TNAN receives a DHCPv6 (Version 6) request message or a DHCPv4 (Version 4) discovery message, a process of allocating an IP address is executed; and the TNAN finds, according to a UE's MAC address included in the received DHCPv6 request message or DHCPv4 discovery message, an IP address corresponding to the UE's MAC address, and carries an IP address in a DHCPv6 response message or a DHCPv4 acknowledgment message to the UE.

Way 2: the EAP authentication message triggers the TNAN to establish a session through which allocation of an IP address is delayed to the UE but in which an APN is carried to a P-GW.

Steps 311 to 312: after receiving an EAP-SUCCESS message, the TNAN initiates to the P-GW a session establishment request message, in which an indication of delaying allocation of an IP address is carried to notify the P-GW to delay to allocate the IP address to the UE; the TNAN carries the APN requested by the UE to the P-GW and establishes an S2a session with the P-GW; and the P-GW does not carry an IP address of the UE in a session establishment response message according to the indication included in the session establishment request message. The TNAN locally stores an association relationship between the UE's MAC address and the core network session. The P-GW locally stores an association relationship between the core network session and the APN.

Step 313s to 315: if the TNAN receives a routing request message, the TNAN finds, according to a UE's MAC address included in the routing request message, a core network session identifier corresponding to the UE's MAC address; the TNAN requests, through a reconstructed routing request message, the P-GW to allocate an IP address, wherein the P-GW may find a locally-stored APN according to the core network session identifier, and return an IPv6 address allocated to the UE. In addition, the TNAN sends to the UE a routing response message carrying the IPv6 address allocated by the P-GW to the UE. The P-GW needs to locally store an association relationship between the UE's IP address and the core network session identifier.

When receiving a routing request or a routing notification message, a network element of the TNAN generates, after locally parsing these packets, a new routing request or routing notification message, and sends to the network element of the P-GW the new routing request or routing notification message carrying an associated core network session identifier. It should be noted that the network element of the TNAN does not forward a routing request or a routing notification message as a relay.

Steps 316 to 317: if the TNAN receives a DHCPv6 request message or a DHCPv4 discovery message, then an IP address allocation process is executed; after receiving the DHCPv6 request message or the DHCPv4 discovery message, the network element of the TNAN, functioning as a DHCP relay, adds the associated core network session identifier to the received DHCPv6 request message or DHCPv4 discovery message, and forwards the DHCPv6 request message or the DHCPv4 discovery message to the P-GW; the P-GW, functioning as a DHCP server, will allocate, according to IPv6 or IPv4 information supported implicitly in the DHCP message, an IPv6 or IPv4 address to the UE, and return the allocated IPv6 or IPv4 address to the UE through a DHCPv6 response or DHCPv4 acknowledgement message. Message interaction between the TNAN and the P-GW refers to Step 315a0, Step 315a1 and Step 316a. The P-GW needs to locally store the association relationship between the UE's IP address and the core network session identifier.

Generally, since IPv6 addresses are sufficient, a way of delaying allocation of an IP address may be rarely applied. However, for the IPv4 addresses which are insufficient, a way of delaying allocation of an IP address is likely to be applied.

Way 3: the EAP authentication message triggers the TNAN to establish a session through which an IP address is not allocated to the UE and an APN is not carried to a P-GW.

Steps 311 to 312: after receiving an EAP-SUCCESS message, the TNAN will initiate a session establishment process to the P-GW, wherein the TNAN does not carry an APN requested by the UE, but establishes an S2a session with the P-GW; and the P-GW does not allocate IP addresses to the UE. The TNAN locally stores the association relationship between UE's MAC address and the core network session.

Steps 313 to 315: if the TNAN receives a routing request message, the TNAN finds, according to a UE's MAC address included in the routing request message, APN information corresponding to the UE's MAC address; the TNAN carries the APN information in the reconstructed routing request message, and requests the P-GW to allocate an IP address; and the P-GW returns an IPv6 address allocated to the UE. In addition, the TNAN sends to the UE a routing response message carrying the IPv6 address allocated by the P-GW to the UE. Message interaction between the TNAN and the P-GW refers to Step 314a0 and Step 314a1.

Steps 316 to 317: if the TNAN receives a DHCPv6 request message or a DHCPv4 discovery message, then an IP address allocation process is executed; after receiving the DHCPv6 request message or the DHCPv4 discovery message, the network element of the TNAN, functioning as a DHCP relay, adds the APN information to the DHCPv6 request message or the DHCPv4 discovery message, and forwards to the P-GW the DHCPv6 request message or the DHCPv4 discovery message added with the APN information; the P-GW, functioning as a DHCP server, will allocate, according to IPv6 or IPv4 information supported implicitly in the DHCP message, an IPv6 or IPv4 address to the UE, and return the allocated IPv6 or IPv4 address to the UE through a DHCPv6 response or DHCPv4 acknowledgement message. Message interaction between the TNAN and the P-GW refers to Step 315a0, Step 315a1 and Step 316a. The P-GW needs to locally store the association relationship between the UE's IP address and the core network session identifier.

The third way is not only applicable to an IPv6 mode, but also applicable to an IPv4 mode. Please refer to the second way for specific description.

Optionally, the TNAN will carry, in the EAP-RES/Identity message, the APN requested by the UE to an AAA, and then the AAA carries, in a Request Profile message, the APN requested by the UE to an HSS. The HSS decides, according to the received APN information, not to send a default APN to the AAA.

If the UE supports a plurality of PDN connections and each APN corresponds to one PDN connection, Steps 302 to 319 need to be performed during each PDN connection.

Embodiment 2

Figure 4:
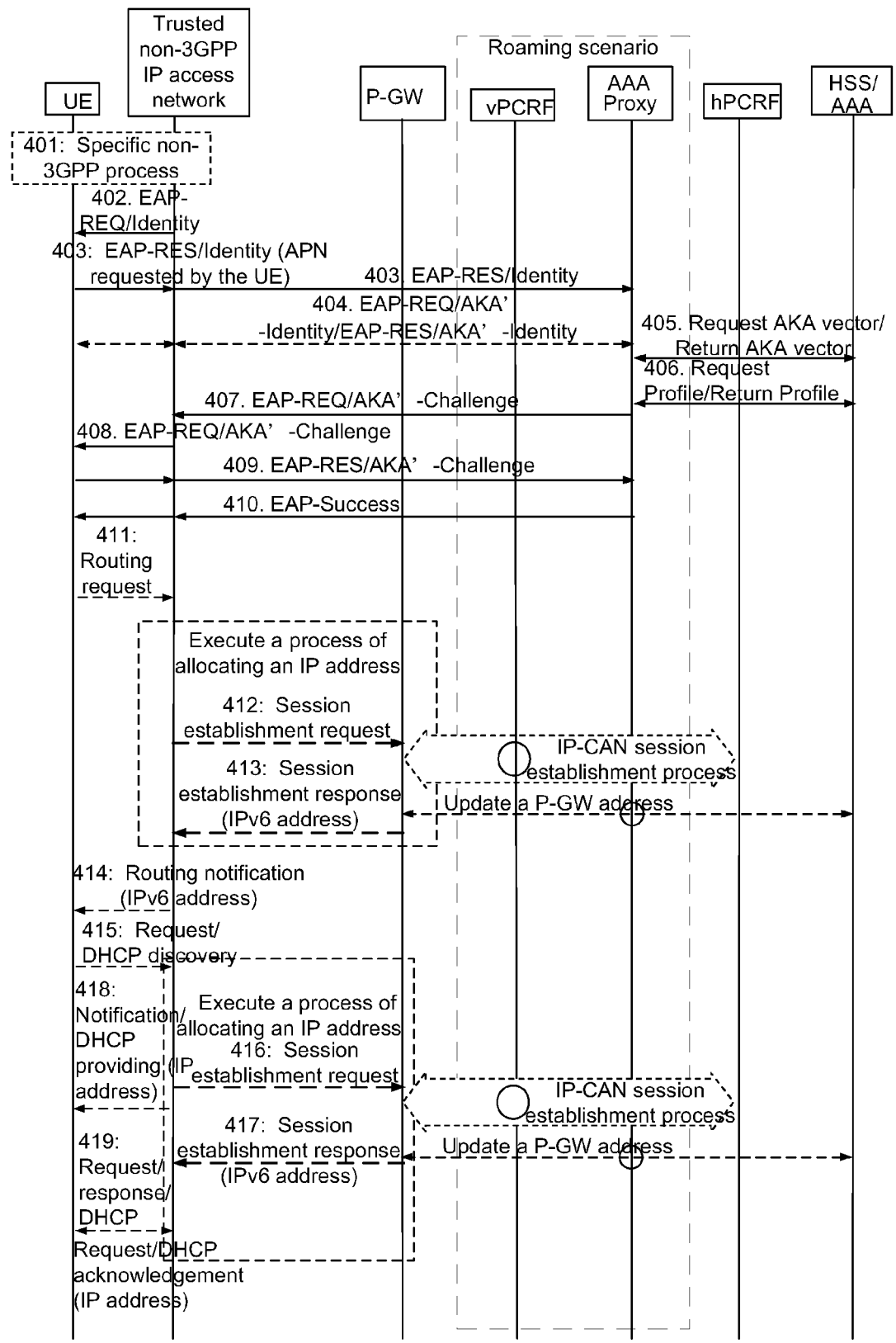
FIG. 4 is a flowchart of carrying an APN requested by a UE in an EAP authentication message by the UE in another embodiment of the disclosure.

In the present embodiment, an EAP authentication message supports to carry an APN requested by a UE to a TNAN. The TNAN decides whether to support to carry the APN requested by the UE to an EPC. A routing request message or a DHCP message triggers the TNAN to establish a GTP/PMIP session to a P-GW, which may specifically refer to a flow as shown in FIG. 4. The flow includes the following steps:

Steps 401 to 410 are the same as Steps 301 to 310.

After the EAP is authenticated successfully, the TNAN locally stores an association relationship between a UE's MAC address and an APN.

Steps 411 to 414: if the TNAN receives a routing request message, the TNAN finds, according to the UE's MAC address, the APN corresponding to the UE's MAC address; the TNAN requests, through a session establishment request message, the P-GW to allocate an IP address, wherein the session establishment request message carries APN information; and the P-GW returns an IPv6 address allocated to the UE. In addition, the TNAN sends to the UE a routing response message carrying the IPv6 address allocated by the P-GW to the UE. The P-GW needs to store an association relationship between UE's IP address and the core network session identifier.

Steps 415 to 419: if the TNAN receives a DHCPv6 request message or a DHCPv4 discovery message, the TNAN finds, according to a UE's MAC address, an APN corresponding to the received message; the TNAN requests, through a session establishment request message, the P-GW to allocate an IP address, wherein the session establishment request message carries APN information; and the P-GW returns an IPv6 address or an IPv4 address allocated to the UE. In addition, the TNAN returns to the UE, the allocated IPv6 address or IPv4 address through a DHCPv6 response message or a DHCPv4 acknowledgement message. The P-GW needs to store the association relationship between UE's IP address and the core network session identifier.

Embodiment 3

Figure 5:
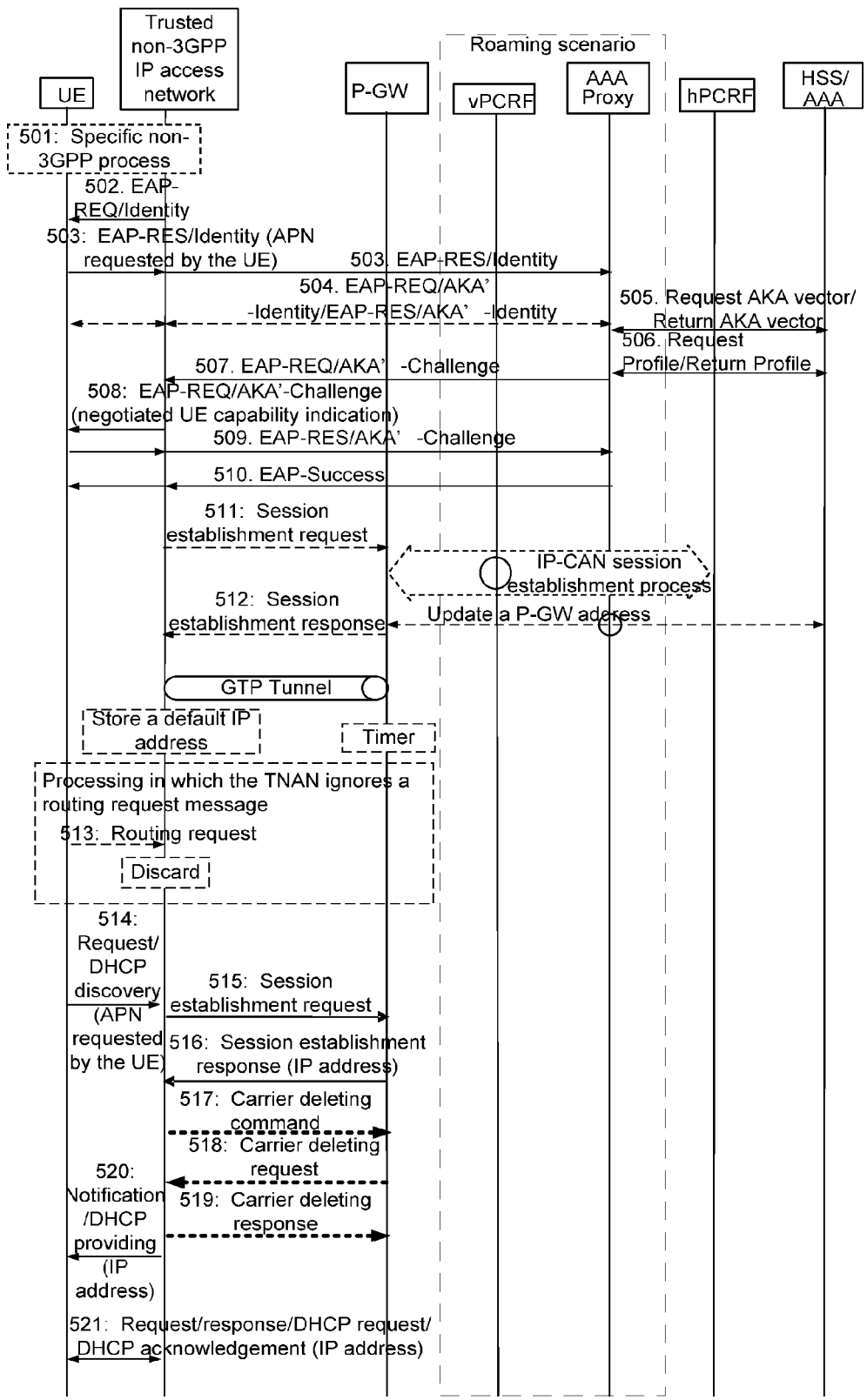
FIG. 5 a flowchart of carrying capability indication of a UE in an EAP authentication message by the UE in an embodiment of the disclosure.

In the present embodiment, a UE carries, in an EAP authentication process, UE capability indication instead of APN information to a TNAN. The TNAN decides the final capability indication according to local capability indication and the UE capability indication. The TNAN establishes a dedicated carrier with a P-GW and deletes a default carrier, which may specifically refer to a flow as shown in FIG. 5. The flow includes the following steps:

Step 501: a UE and a network element of a TNAN execute a specific non-3GPP process.

Steps 502 to 510: the TNAN, as an EAP authenticator, will trigger an EAP authentication process to the UE, wherein the UE carries UE capability indication in an EAP-RES/Identity to the TNAN. The TNAN will negotiate the UE capability indication according to the UE capability indication carried by the UE and the locally allowed UE capability indication. A specific negotiation principle is as follows:

if the UE capability indication carried by the UE is that the UE supports to carry an APN, but the TNAN does locally not support the UE to carry a message of the APN, the UE capability indication obtained through the negotiation indicates not to support the UE to carry the APN. If the UE capability indication carried by the UE indicates that the UE does not support to carry an APN, but the TNAN locally supports the UE to carry the message of the APN, the UE capability indication obtained through the negotiation indicates not to support the UE to carry the APN. The UE capability indication may be also represented by other forms, but the expression should have the same meaning with the purpose implemented by the above description.

The TNAN locally stores an association relationship between an International mobile Subscriber Identity (IMSI) and the negotiated UE capability indication, and carries the negotiated UE capability indication in an EAP-REQ/AKA'-Challenge message to the UE.

Solutions for the UE to acquire an IP address specifically include several ways as follows:

Way 1: the EAP authentication message triggers the TNAN to establish a session through which an IP address is allocated to the UE.

Steps 511 to 512: after receiving an EAP-SUCCESS message, the TNAN will initiate a session establishment process to a P-GW; the TNAN carries a subscribed default APN in a session establishment request message to the P-GW; the P-GW allocates an IP address for the UE, and may start a timer which is a timer of a default carrier. The TNAN locally stores the allocated IP address, which may specifically include an IPv4 and/or IPv6 address prefix. A session established between the TNAN and the P-GW is a default carrier.

The TNAN distinguishes, according to the negotiated UE capability indication, IP address request messages received subsequently, which specifically includes the followings:

1) If the negotiated UE capability indication is that the UE does not support to carry the APN information, the TNAN locally allocates, according to a received routing request message or DHCPv6 request, or a DHCPv4 discovery message, a corresponding IP address to the UE.

2) If the negotiated UE capability indication is that the UE supports to carry the APN information, then a routing request message of a DHCP message requires an extended parameter to support to carry the APN information. The routing request message, which belongs to a part of a routing discovery mechanism and is a broadcast message, may not be applicable to be enhanced. Therefore, a DHCPv6 request message is extended preferably. Of course, there is still a possibility of extending the routing request message. The disclosure describes subsequent processing by taking extension of the DHCP message for an example, which specifically refers to Steps 513 to 516.

Step 513: the UE may decide, according to the negotiated UE capability indication, whether to send the routing request message. For example, if the negotiated UE capability indication is that the UE supports to carry the APN information, the UE does not send the routing request message.

Optionally, the UE will always send the routing request message instead of determining whether to send the routing request message. At the moment, if the negotiated UE capability indication is that the UE supports to carry the APN information, the TNAN directly discards the received routing request message.

Steps 514 to 516: if the TNAN receives a DHCPv6 request message or a DHCPv4 discovery message, the TNAN initiates a session establishment request message carrying the APN information, and requests the P-GW to allocate an IP address; and the P-GW returns to the TNAN the IP address allocated to the UE. The IP address may be specifically an IPv6 or IPv4 address.

Steps 517 to 519: if the default timer expires while there is no data on the default carrier, the P-GW sends a carrier deleting request to the TNAN; and the TNAN responds a carrier deleting response message to the P-GW to indicate that the default carrier has been deleted.

If the P-GW does not start a default carrier timer, when the TNAN receives the DHCPv6 request message or the DHCPv4 discovery message, the TNAN will send a carrier deleting command to the P-GW to notify the P-GW to delete the default carrier; then the P-GW initiates a carrier deleting request to the TNAN; and the TNAN responds the carrier deleting response message to the P-GW to indicate that the default carrier has been deleted.

Steps 520 to 521: after receiving a session establishment response message, the TNAN acquires an IPv6 or IPv4 address, and sends a DHCPv6 notification or a DHCPv4 providing message to the UE. The DHCPv6 notification or the DHCPv4 providing message may include the IP address allocated by the P-GW to the UE. Then, the UE sends a DHCP request message to the P-GW; and the P-GW returns to the UE, through a DHCPv6 response or a DHCPv4 acknowledgement message, the allocated IPv6 or IPv4 address.

Way 2: the EAP authentication message triggers the TNAN to establish a session through which an IP address does not be allocated to the UE.

In Step 511 and Step 512, during the process in which a session is established between the TNAN and a P-GW, if the P-GW does not allocate an IP address for the UE, the TNAN does not need to locally store the IP address.

If the negotiated UE capability indication is that the UE does not support to carry the APN information, the TNAN requests, according to a received routing request message or DHCPv6 request message, or a DHCPv4 discovery message, or through a DHCP relay or other ways (specifically referring to Steps 314a0 to 314a1, Steps 315a0 to 315a1, and Step 316a in the first embodiment), the P-GW to allocate an IP address; and the P-GW returns an IPv6 address allocated to the UE. In addition, the TNAN sends to the UE a routing response message carrying the IPv6 address allocated by the P-GW to the UE.

If the negotiated UE capability indication is that the UE supports to carry the APN information, Steps 513 to 521 are executed.

Way 3: a DHCP message triggers the TNAN to establish a session.

Processes related to establishment and deletion of a default carrier does not be executed, which includes Steps 511 to 512, and Steps 517 to 519.

Steps 513 to 516 and Steps 520 to 521 are executed, which are specifically the same as described above.

Embodiment 4

Figure 6:
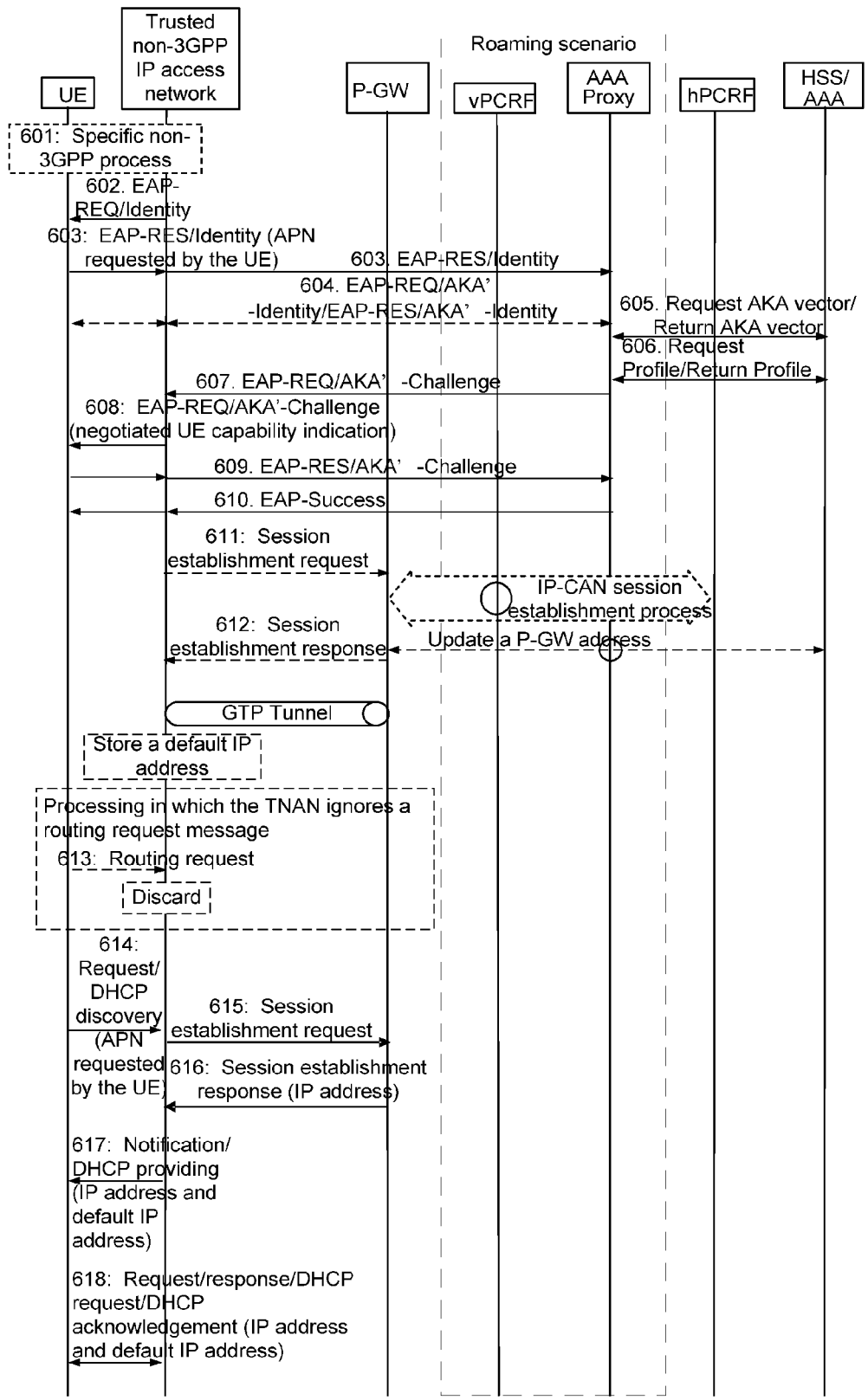
FIG. 6 a flowchart of carrying capability indication of a UE in an EAP authentication message by the UE in another embodiment of the disclosure.

In the present embodiment, a TNAN still reserves a default carrier while establishing a dedicated carrier with a P-GW, which specifically refers to a flow as shown in FIG. 6. The flow includes the following steps:

Steps 601 to 613 are the same as Steps 501 to 513.

Steps 614 to 616: if the TNAN receives a DHCPv6 request message or a DHCPv4 discovery message, the TNAN initiates a session establishment request message carrying APN information, and requests the P-GW to allocate an IP address; and the P-GW returns to the TNAN the IP address allocated to the UE. The IP address may be specifically an IPv6 address or an IPv4 address.

Steps 617 to 618: after receiving a session establishment response message, the TNAN acquires the IP address and sends a DHCPv6 notification or DHCPv4 providing message to the UE. The DHCPv6 notification or DHCPv4 providing message may include the IP address allocated by the P-GW to the UE and a default IP address. Then, the UE sends a DHCP request to the P-GW; and the P-GW returns, through a DHCPv6 response or DHCPv4 acknowledgement message, the allocated IPv6 or IPv4 address to the UE.

Methods for the UE to acquire an IP address mainly include the first way and the second way in the third embodiment.

Embodiment 5

Figure 7:
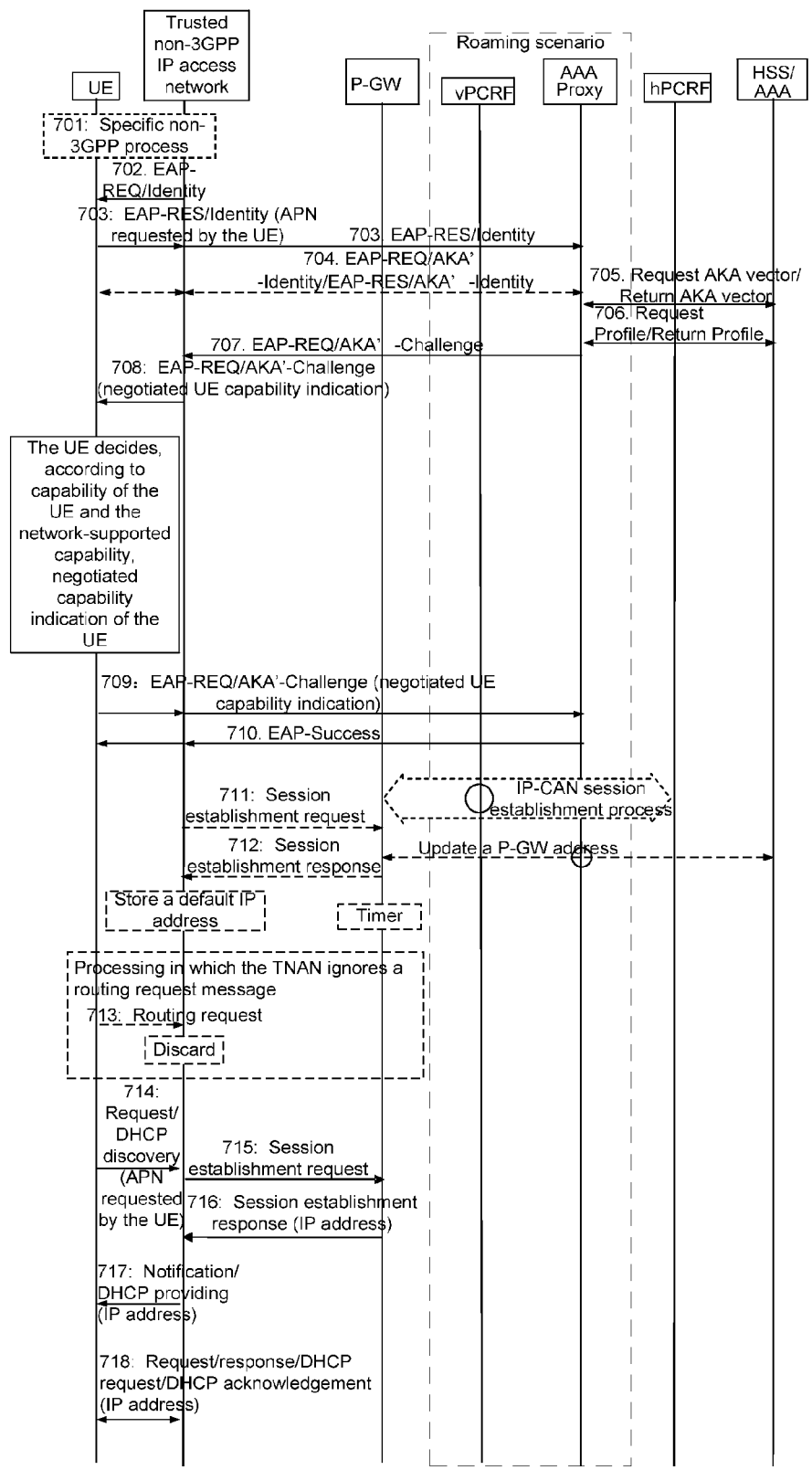
FIG. 7 is a flowchart of carrying network-supported capability indication in an EAP authentication message by a TNAN according to the disclosure.

In the present embodiment, a TNAN carries capability indication supported by a network to a UE first; and the UE decides, according to capability indication of the UE and capability indication supported by a network, the final capability indication. Please refer to related descriptions in the third embodiment for specific definition and negotiation principles of capability indication. Specifically refer to a flow as shown in FIG. 7. The flow includes the following steps:

Steps 701 to 707 are the same as Steps 401 to 407 except that the UE does not send UE capability indication to the TNAN.

Step 708: the TNAN carries in an EAP-REQ/AKA'-Challenge message the capability or mode indication supported by the network to the UE.

The UE will negotiate, according to the capability or mode indication supported by the TNAN and locally supported UE capability indication, the UE capability indication.

Step 709: the UE carries, in the EAP-REQ/AKA'-Challenge message sent to the TNAN, the negotiated UE capability indication to the TNAN. Since the UE is a non-trusted device, the TNAN will verify whether the negotiated UE capability indication is in an allowed range of the capability indication supported by the network, for example, the negotiated UE capability indication is to support the UE to carry an APN while the UE does not support to carry the APN actually.

if mode of the network indicates single connection mode, the UE includes the requested APN.

If the negotiated UE capability indication is not in the allowed range of the capability indication supported by the network, it is still considered that EAP authentication is successful, and Step 710 is executed. In subsequent processes, the TNAN performs processing according to the way that the UE does not support to carry the APN, and will ignore the APN requested by the UE included in a DHCP message.

If the negotiated UE capability indication is in the allowed range of the capability indication supported by the network, Step 710 is executed and subsequent Steps 711 to 718 may be correspondingly processed by referring to the three ways in the second embodiment, and will not be repeated here.

Embodiment 6

Figure 8:
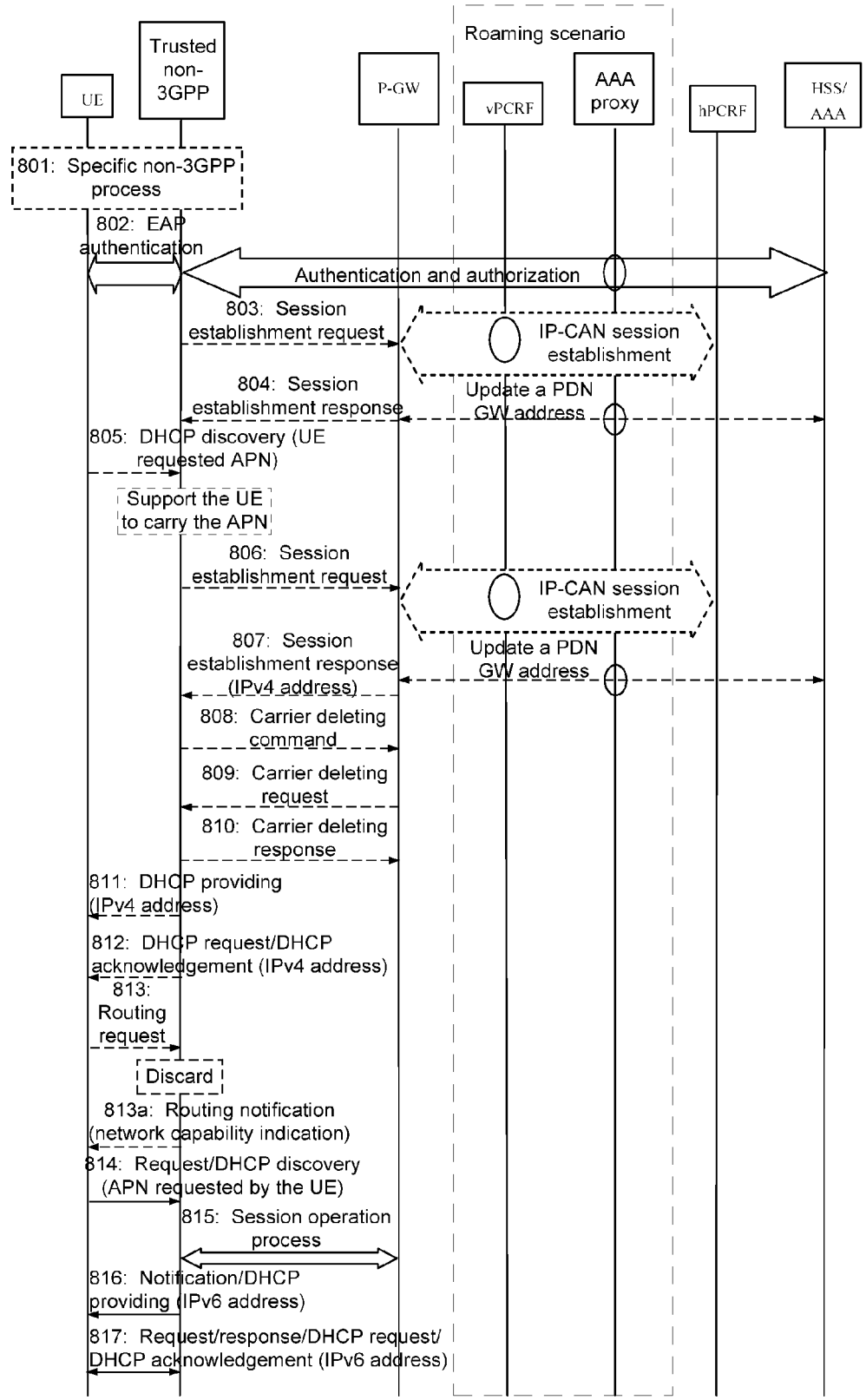
FIG. 8 is a flowchart of carrying network-supported capability indication in an L3 message by a TNAN in an embodiment of the disclosure.

In the present embodiment, in an L3 DHCPv4 message interaction process, capability indications of a UE and a network side are acquired through negotiation. If the UE requests an IPv4 address first, the capability indication is negotiated through a DHCPv4 message. Specific definition and negotiation principles of the capability indication may refer to related descriptions in the third embodiment. If the UE and the network side both support the UE to carry a requested APN, a specific flow may refer to FIG. 8. The flow includes the following steps:

Steps 801 to 804 are the same as Steps 301 to 310 except that capability indication is not negotiated in an EAP authentication process.

Steps 805 to 812: if the TNAN receives a DHCPv4 discovery message, the TNAN decides, according to local capability indication and a APN requested by the UE included in the DHCPv4 discovery message, whether to allow the UE to carry the APN requested by the UE. If the UE is allowed to carry the APN requested by the UE, the TNAN initiates a session establishment request message carrying APN information, and requests the P-GW to allocate an IP address; and the P-GW returns to the TNAN the IP address allocated to the UE. Processes between the TNAN and the P-GW may refer to related descriptions in the fifth embodiment.

Based on the decision result, the TNAN will perform the following processing in an IPv6 network scenario:

if the TNAN's decision is to allow the UE to carry the APN requested by the UE, the following processing will be performed:

Step 813: if a routing request message is received, the TNAN discards the routing request message.

Steps 814 to 817: if the TNAN receives a DHCPv6 request message, the TNAN initiates a session establishment request message, which carries APN information and is used to request the P-GW to allocate an IP address; and the P-GW returns to the TNAN an IP address allocated to the UE.

If the TNAN's decision is not to allow the UE to carry the APN requested by the UE, the following processing will be performed:

if the TNAN receives a routing request message or a DHCPv6 request message, the TNAN requests the P-GW to allocate an IP address, and returns the allocated IP address to the UE. Specific processing is the same as the processing in which the UE does not carry the requested APN information.

The above description takes a DHCPv4 decision result as an example, and is the same as the description made by taking a DHCPv6 decision result as an example.

Embodiment 7

Figure 9:
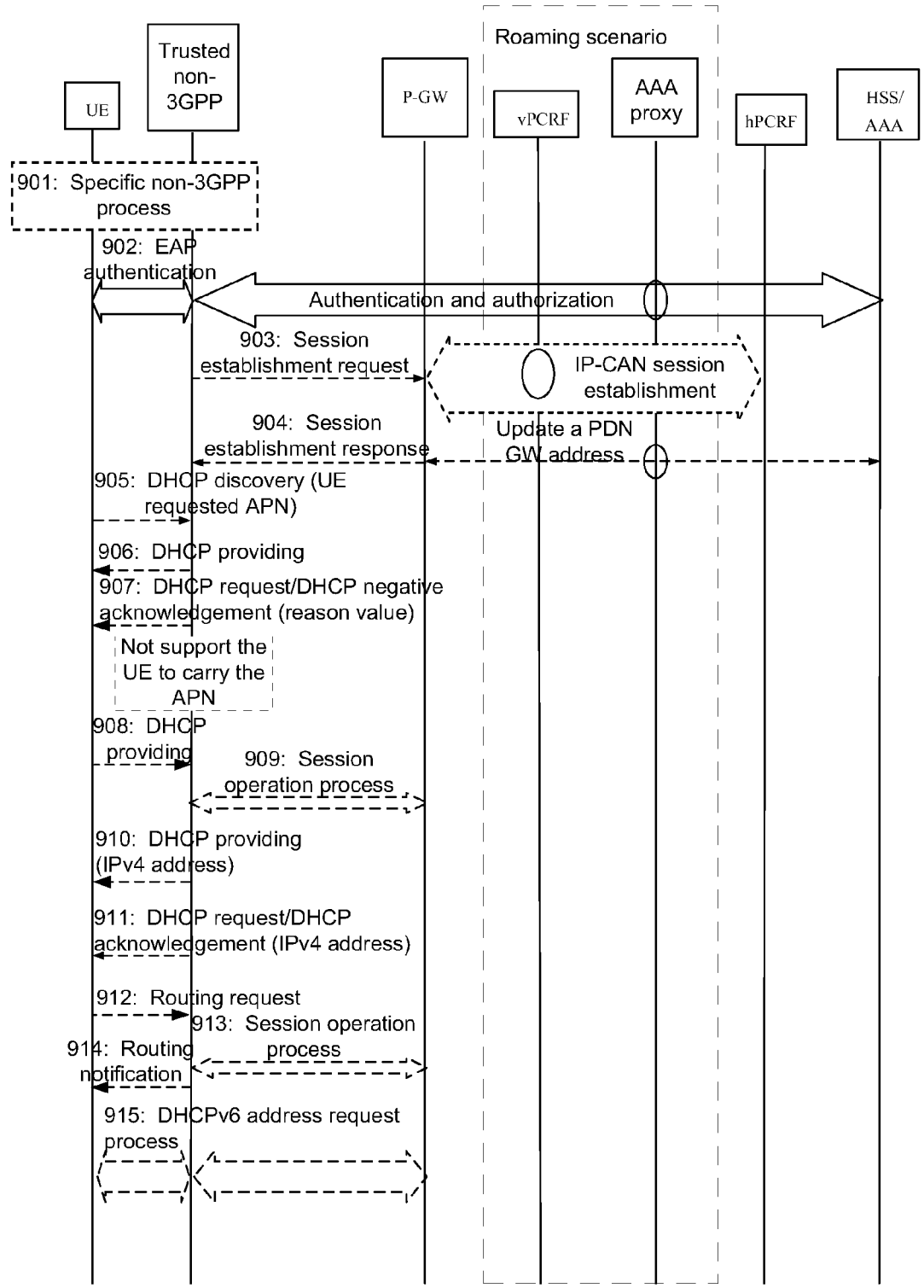
FIG. 9 is a flowchart of carrying network-supported capability indication in an L3 message by a TNAN in another embodiment of the disclosure.

The present embodiment is different from the sixth embodiment in that if the network side does not support the UE to carry a requested APN, which may be referred to a flow as shown in FIG. 9. The flow includes the following steps:

Steps 901 to 904 are the same as Steps 801 to 804.

Steps 905 to 907: if the TNAN receives a DHCPv4 discovery message, the TNAN decides, according to local capability indication and the APN requested by the UE included in the received DHCPv4 discovery message, whether to allow the UE to carry requested APN information. If the UE is not be allowed to carry requested APN information, the TNAN carries a specific reason value in a DHCP negative acknowledgement message to indicate that the UE is not supported to carry the requested APN information.

Step 908: after receiving the DHCP negative acknowledgement message, the UE will re-send a DHCP discovery message in which the requested APN information is not included.

Steps 909 to 911: the UE acquires the allocated IP address through a DHCP process.

When the UE requested an IPv6 address, the UE may send, according to the network capability indication, a routing request message or a DHCPv6 request message. Specific processing is the same as the processing in which the UE does not carry the requested APN information, specifically as follows:

Steps 912 to 914: if the routing request message is received by the TNAN, the TNAN requests the P-GW to allocate an IPv6 address, and sends to the UE a routing notification message including the IPv6 address allocated by the P-GW to the UE.

Step 915: if the DHCPv6 request message is received by the TNAN, the TNAN requests the P-GW to allocate an IPv6 address, and sends to the UE a DHCPv6 acknowledgement message including the IPv6 address allocated by the P-GW to the UE.

The description above takes a DHCPv4 decision result as an example, and is the same as the description made by taking a DHCPv6 decision result as an example.

Embodiment 8

Figure 10:
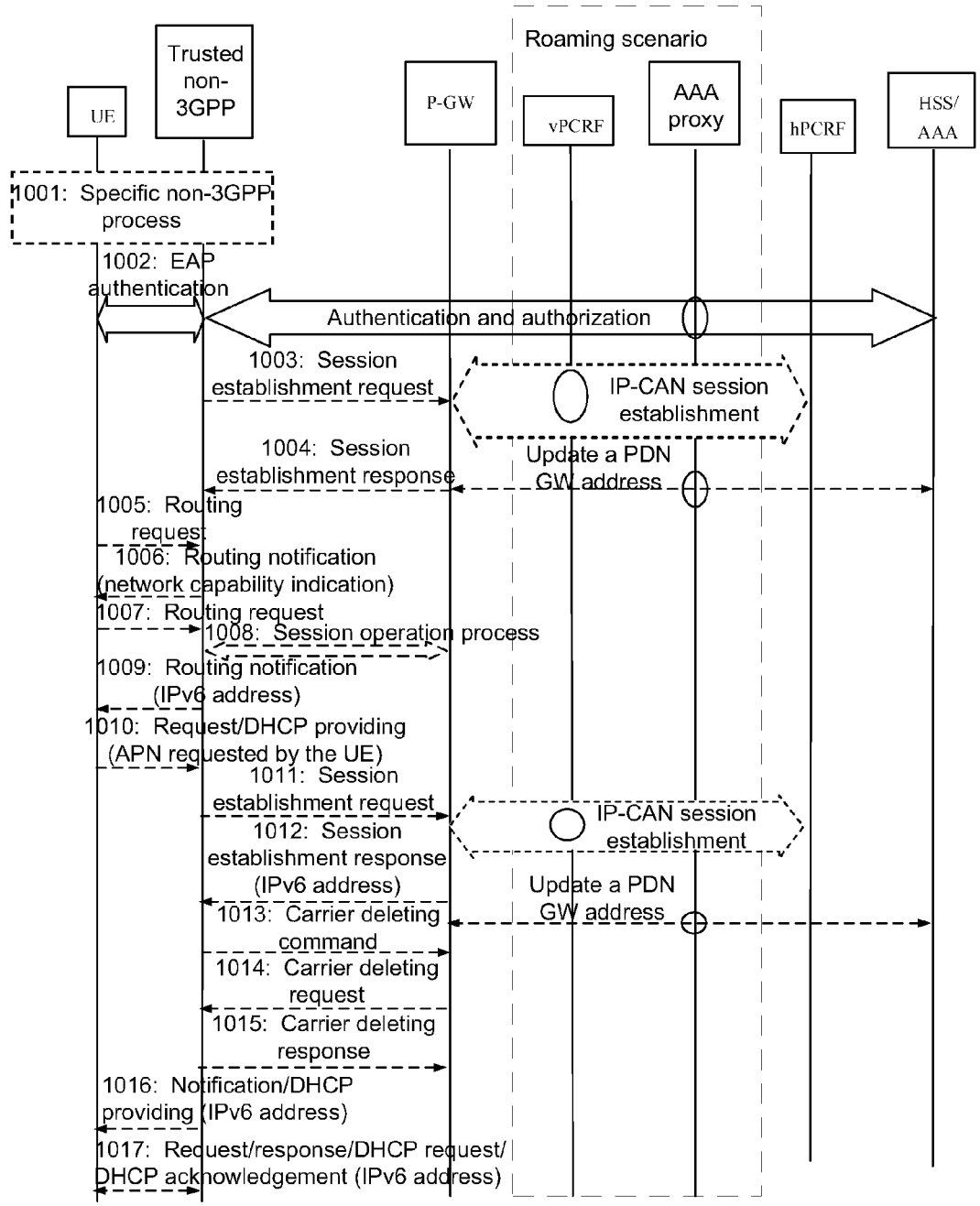
FIG. 10 is a flowchart of carrying network-supported capability indication in an L3 message by a TNAN in a third embodiment of the disclosure.

In the present embodiment, the UE sends a routing request message first, and capability indication of a network is notified to the UE through a routing notification message, which may specifically refer to a flow as shown in FIG. 10. The flow includes the following steps:

Steps 1001 to 1004 are the same as Steps 801 to 804.

Step 1005: if the TNAN receives a routing request message, the TNAN decides, according to local capability indication, whether to allow the UE to carry requested APN information. Specific processing is as follows:

If the UE is allowed to carry the requested APN information, Step 1006 is referred to.

Step 1006: the TNAN directly returns to the UE a routing notification message carrying the capability indication of the network, to indicate to support the UE to carry the requested APN information.

If the UE is not allowed to carry the requested APN information, the TNAN processes the routing request message normally, referring to Steps 1007 to 1009.

Steps 1007 to 1009: the TNAN requests the P-GW to allocate an IP address, and returns the allocated IP address to the UE. Specific processing is the same as the processing in which the UE does not carry the requested APN information.

If the UE receives the routing notification message carrying the capability indication of the network, the UE decides, according to the capability indication of the network and the capability of the UE to support to carry the requested APN, whether the UE is allowed to carry the requested APN, and performs specific distinguishing processing according to the decision result:

if the UE does not support to carry the requested APN, the routing request message may be sent immediately or after a period of time. The TNAN receives the routing request message again, and processing is the same as Steps 1007 to 1009. Alternatively, the UE may also send a DHCPv6 request message in which the requested APN is not included, and specific processing is the same as the processing in which the UE does not carry the requested APN.

If the UE supports to carry the requested APN, the DHCPv6 request message will be sent and include the requested APN, referring to Steps 1010 to 1017. Specific processing is the same as Steps 814 to 817.

Embodiment 9

In the present embodiment, a UE sends a DHCPv6 request message first, and specific processing may refer to the processing of Steps 805 to 812 in the sixth embodiment, or the processing in Steps 905 to 911 in the seventh embodiment.

In the embodiments above, a GTP tunnel is established between a network element of a 3GPP access network and a P-GW. Of course, the embodiments above are also applicable to establishment of a PMIP tunnel, as long as replacement of corresponding messages is performed. For example, a session establishment message is replaced by a proxy bonding update message, and a session establishment response message is replaced by a proxy bonding acknowledgement message. Parameters that need to be transmitted during establishment of the GTP tunnel between the network element of the non-3GPP access network and the P-GW are also applicable to a PMIP message, which specifically includes an APN requested by a UE.

In addition, an IPv6 address received by the UE may be an IPv6 prefix.

Figure 11:
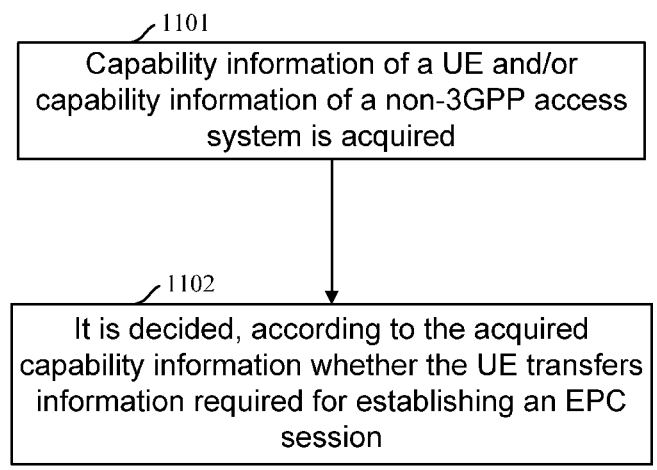
FIG. 11 is a simple flowchart illustrating access to a core network through non-3GPP in an embodiment of the disclosure.

It can be seen from the embodiments above that the operation thought of accessing a core network by means of non-3GPP access according to the disclosure may be expressed by a flow as shown in FIG. 11. The flow includes the following steps:

Step 1101: capability information of a UE and/or capability information of a non-3GPP access system is acquired.

Step 1102: it is decided, according to the acquired capability information whether the UE is allowed to transfer information required for establishing an EPC session.

The non-3GPP system may be a trusted non-3GPP system or a non-trusted non-3GPP.

Figure 12:
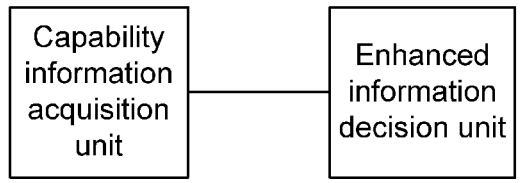
FIG. 12 is a system diagram illustrating access to a core network through non-3GPP in an embodiment of the disclosure.

To ensure that the embodiments above and operation thoughts can be implemented successfully, settings as shown in FIG. 12 may be applied. Referring to FIG. 12, which is a system diagram of accessing a core network by means of non-3GPP access in an embodiment of the disclosure, the system includes a capability information acquisition unit and an enhanced information decision unit connected to each other.

The capability information acquisition unit may be arranged in a UE, or may be also arranged in a non-3GPP access system (trusted or non-trusted) including a non-3GPP access network. Of course, the capability information acquisition unit may be further arranged in other communication functional entities including a 3GPP access system, as long as capability information of the UE and/or capability information of a non-3GPP access system can be acquired successfully.

Similar to the capability information acquisition unit, the enhanced information decision unit may be arranged in a UE, or may be also arranged in a non-3GPP access system (trusted or non-trusted) including a non-3GPP access network. Of course, the capability information acquisition unit may be further arranged in other communication functional entities including a 3GPP access system, as long as whether the UE is allowed to transfer information required for establishing an EPC session can be decided according to the capability information acquired by the capability information acquisition unit.

It needs to be noted that the enhanced information decision unit is further configured to send to the UE a decision result indicating whether the UE is allowed to transfer the information required for establishing the EPC session.

After making the decision, the enhanced information decision unit determines to allow the UE to transfer the information required for establishing the EPC session; and the enhanced information decision unit is further configured to:

after receiving an APN requested by the UE, transfer to an EPC an APN requested by the UE.

Information of the APN is configured to represent the capability of the UE implicitly.

The capability information of the UE is carried in an EAP authentication message or a DHCP message.

The information required for establishing the EPC session is carried in the EAP authentication message or the DHCP message.

The capability information of the UE is the APN requested by the UE or capability indication of the UE.

The capability information of the non-3GPP access system is local capability indication of the non-3GPP access system.

The information required for establishing the EPC session is the requested APN.

The capability information acquisition unit is arranged in the UE or the non-3GPP access system.

The enhanced information decision unit is arranged in the UE or the non-3GPP access system.

To sum up, it can be seen that no matter the method, the device or the system, through the technology of accessing a core network by means of the non-3GPP access, can enhance the capability of the UE to support establishment of an extra PDN connection, and service continuity during switching between access systems. Meanwhile, the capability of the peer can be acquired through the UE and the network, so that the network can simultaneously support normal access by an existing UE and an enhanced UE.

The above are only the preferred embodiments of the disclosure, and are not intended to limit the scope of protection of the claims of the disclosure.

The invention claimed is:

1. A method for accessing a core network by means of trusted non-3rd Generation Partnership Project (3GPP) access, comprising:
   acquiring, by a User Equipment (UE), capability or mode information of a trusted non-3GPP access system; and
   deciding, according to the acquired capability or mode information, whether the UE transfers information required for establishing an Evolved Packet Core (EPC) session,
   wherein the information required for establishing the EPC session is carried in an Extensible Authentication Protocol (EAP) authentication message,
   wherein the information required for establishing the EPC session is an Access Point Name (APN) requested by the UE,
   wherein the capability or mode information of the trusted non-3GPP access system is information on whether to allow the UE to carry the requested APN.

2. The method according to claim 1, after the decision is made and it is determined to transfer by the UE the information required for establishing the EPC session, the method further comprising:
   after the trusted non-3GPP access system receives the APN requested by the UE, transferring, by the trusted non-3GPP access system, to an EPC the APN requested by the UE.

3. The method according to claim 1, wherein
   the capability information of the trusted non-3GPP access system is local capability indication of the trusted non-3GPP access system.

4. The method according to claim 1, wherein
   the deciding is performed by the UE.

5. A system for accessing a core network by means of trusted non-3rd Generation Partnership Project (3GPP) access, comprising:
   a memory;
   one or more processors; and
   a capability information acquisition unit and an enhanced information decision unit, these units are stored in the memory and executed by the one or more processors, wherein
   the capability information acquisition unit acquires capability or mode information of a trusted non-3GPP access system; and
   the enhanced information decision unit decides, according to the capability or mode information acquired by the capability information acquisition unit, whether a User Equipment (UE) transfers information required for establishing an Evolved Packet Core (EPC) session,
   wherein the information required for establishing the EPC session is carried in an Extensible Authentication Protocol (EAP) authentication message,
   wherein the information required for establishing the EPC session is an Access Point Name (APN) requested by the UE,
   wherein the capability or mode information of the trusted non-3GPP access system is information on whether to allow the UE to carry the requested APN.

6. The system according to claim 5, wherein after the decision is made and the enhanced information decision unit determines to transfer by the UE the information required for establishing the EPC session,
   the trusted non-3GPP access system receives the requested APN carried by the UE, and transfers to an EPC the APN requested by the UE.

7. The system according to claim 5, wherein
   the capability information acquisition unit is arranged in the UE; and
   the enhanced information decision unit is arranged in the UE.

8. A device for accessing a core network by means of trusted non-3rd Generation Partnership Project (3GPP) access, wherein the device is a User Equipment (UE) configured to: acquire capability or mode information of a trusted non-3GPP access system, decide whether the UE transfers information required for establishing an Evolved Packet Core (EPC) session; and determine, according to the decision result, whether to transfer the information required for establishing the EPC session,
   wherein the information required for establishing the EPC session is carried in an Extensible Authentication Protocol (EAP) authentication message,
   wherein the information required for establishing the EPC session is an Access Point Name (APN) requested by the UE,
   wherein the capability or mode information of the trusted non-3GPP access system is information on whether to allow the UE to carry the requested APN.

* * * * *